(12) United States Patent
Elias

(10) Patent No.: US 8,749,497 B2
(45) Date of Patent: Jun. 10, 2014

(54) MULTI-TOUCH SHAPE DRAWING

(75) Inventor: John Greer Elias, Townsend, DE (US)

(73) Assignee: Apple Inc., Cupertino, CA (US)

( * ) Notice: Subject to any disclaimer, the term of this patent is extended or adjusted under 35 U.S.C. 154(b) by 1160 days.

(21) Appl. No.: 12/333,415

(22) Filed: Dec. 12, 2008

(65) Prior Publication Data

US 2010/0149109 A1  Jun. 17, 2010

(51) Int. Cl.
| | |
|---|---|
| G06F 3/041 | (2006.01) |
| G06F 3/033 | (2013.01) |
| G06K 11/06 | (2006.01) |
| G08C 21/00 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/27 | (2006.01) |
| G06F 17/28 | (2006.01) |

(52) U.S. Cl.
USPC .............. 345/173; 178/18.01; 178/18.03; 715/211; 715/863

(58) Field of Classification Search
USPC .................... 345/173–178; 715/211, 863
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,544,265 A | 8/1996 | Bozinovic et al. | |
| 5,621,817 A | 4/1997 | Bozinovic et al. | |
| 5,809,267 A * | 9/1998 | Moran et al. ................ | 715/863 |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,459,442 B1 * | 10/2002 | Edwards et al. ............. | 715/863 |
| 6,690,387 B2 | 2/2004 | Zimmerman et al. | |
| 7,015,894 B2 | 3/2006 | Morohoshi | |
| 7,030,861 B1 * | 4/2006 | Westerman et al. ......... | 345/173 |
| 7,184,064 B2 | 2/2007 | Zimmerman et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Just Another iPhone Blog, Nov. 10, 2008, pp. 1-12, http://justanotheriphoneblog.com/wordpress/2008/02/13/sketches-updated-adds-multitouch-drawings/.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Sumati Lefkowitz
*Assistant Examiner* — David Tung
(74) *Attorney, Agent, or Firm* — Morrison & Foerster LLP

(57) ABSTRACT

Multi-touch shape drawing. The use of multi-touch gesture detection improves the user interface experience associated with generating and modifying shapes. By associating unique multi-touch gestures with the generation of corresponding shapes, the accuracy and ease of use with which shapes can be generated can be improved. By associating multi-touch gestures with the modification of shapes, the ease of use with which shapes can be modified can be improved.

21 Claims, 26 Drawing Sheets

(56) References Cited

U.S. PATENT DOCUMENTS

| | | |
|---|---|---|
| 7,324,691 B2 | 1/2008 | Li et al. |
| 7,663,607 B2 | 2/2010 | Hotelling et al. |
| 8,479,122 B2 | 7/2013 | Hotelling et al. |
| 2005/0063592 A1* | 3/2005 | Li et al. ............ 382/181 |
| 2006/0010400 A1* | 1/2006 | Dehlin et al. ........ 715/856 |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2007/0065013 A1 | 3/2007 | Saund et al. |
| 2007/0103452 A1* | 5/2007 | Wakai et al. ......... 345/173 |
| 2008/0158172 A1 | 7/2008 | Hotelling et al. |
| 2009/0128516 A1* | 5/2009 | Rimon et al. ........ 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

MULTI-TOUCH SHAPE DRAWING

FIELD OF THE INVENTION

This relates generally to drawing shapes using a computing device, and more particularly, to improving the user interface experience associated with generating and modifying shapes using a computing device.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch screens provide a user interface experience through which particular classes of applications, such as drawing applications for example, have flourished. Such drawing applications typically allow users to draw freehand sketches, usually based on input received from a stylus. Since it is difficult for a user to draw perfect geometric shapes (e.g., lines, circles, squares, etc.) using freehand motion, drawing applications may incorporate various features to enable the generation of perfect geometric shapes based on user input. With one feature, the drawing application can utilize shape recognition on a user's freehand sketch to determine which shape the user intended to draw, and replace the freehand sketch with a perfect rendering of the determined shape. With another feature, the drawing application can enable the user to select the type of shape the user intends to draw, and generate the shape for the user. However, inaccuracy of shape recognition and the additional steps required to select a shape produce a negative impact on the user interface experience associated with drawing shapes.

SUMMARY OF THE INVENTION

Multi-touch shape drawing is disclosed. The use of multi-touch gesture detection improves the user interface experience associated with generating and modifying shapes. By associating unique multi-touch gestures with the generation of corresponding shapes, the accuracy and ease of use with which shapes can be generated can be improved. By associating multi-touch gestures with the modification of shapes, the ease of use with which shapes can be modified can be improved.

DETAILED DESCRIPTION OF THE PREFERRED EMBODIMENTS

In the following description of preferred embodiments, reference is made to the accompanying drawings where it is shown by way of illustration specific embodiments in which the invention can be practiced. It is to be understood that other embodiments can be used and structural changes can be made without departing from the scope of the embodiments of this invention.

This relates to improving the user interface experience associated with generating and modifying shapes by using multi-touch gesture detection. By associating unique multi-touch gestures with the generation of corresponding shapes, the accuracy and ease of use with which shapes can be generated can be improved. Further, by associating multi-touch gestures with the modification of shapes, the ease of use with which shapes can be modified can be improved.

Although some embodiments of this invention may be described and illustrated herein in terms of display-based multi-touch input devices, it should be understood that embodiments of this invention are not so limited, but are generally applicable to any type of multi-touch input device, including those separate from a display.

Multi-touch touch-sensitive panels according to one embodiment of this invention can detect multiple touches (touch events or contact points) that occur at about the same time (and at different times), and identify and track their locations. Touch sensor panels are disclosed, for example, in U.S. application Ser. No. 10/840,862 entitled "Multipoint Touchscreen," filed May 6, 2004, and U.S. application Ser. No. 11/649,998 entitled "Proximity and Multi-Touch Sensor Detection and Demodulation," filed Jan. 3, 2007, the contents of which are incorporated herein by reference in their entirety for all purposes.

Figure 1:
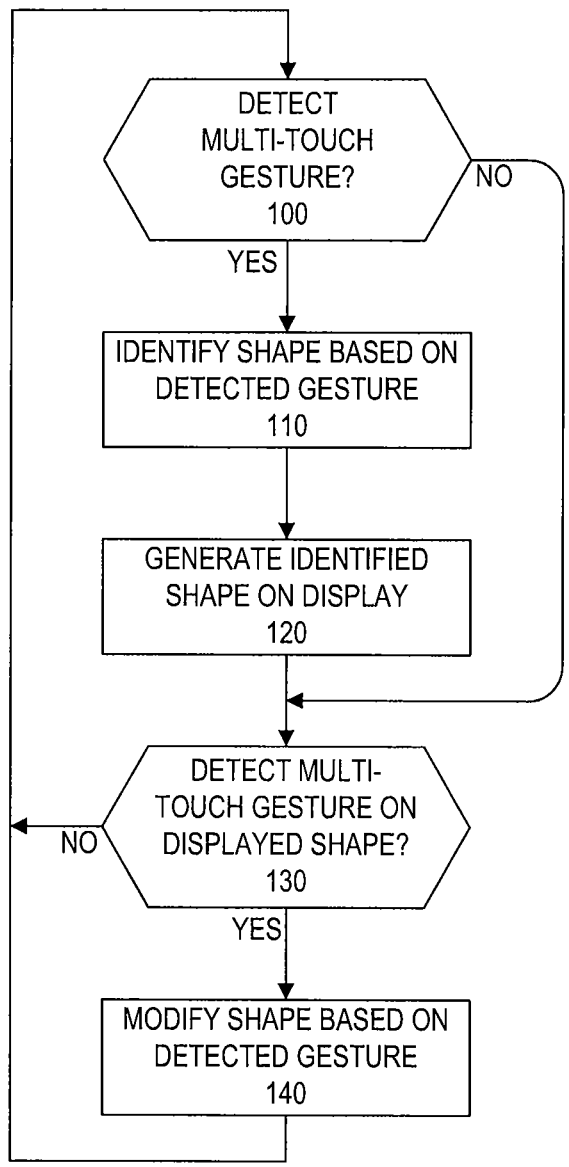
FIG. 1 illustrates an exemplary process for generating and modifying shapes using multi-touch gestures according to an embodiment of the invention.

FIG. 1 illustrates a process for generating and modifying shapes using multi-touch gestures according to an embodiment of the invention. To enable multi-touch shape generation, a computing device can be configured to detect a multi-touch gesture applied to a touch-sensitive surface associated with the device (block 100). The device can identify a geometric shape to be generated based on the detected multi-touch gesture (block 110), and generate the identified geometric shape on a display associated with the device (block 120). To enable multi-touch shape modification, the device can be configured to detect a multi-touch gesture applied to a geometric shape displayed by the device (block 130), and modify the displayed geometric shape based on the multi-touch gesture (block 140).

A multi-touch gesture refers to a gesture involving two or more concurrent points of contact with an input device. Any suitable multi-touch gesture may be mapped to the generation and/or modification of shapes. FIGS. 2-8 illustrate exemplary multi-touch shape generating and modifying gestures that can be associated with various geometric shapes in connection with input device 110 and display 100 of a computing device. The multi-touch gestures can be applied to a touch sensitive surface of input device 110, and the associated shapes can be displayed by display 100. A description of available multi-touch gestures can be stored in a gesture dictionary in a memory associated with the computing device for instructional purposes.

Figure 2A:
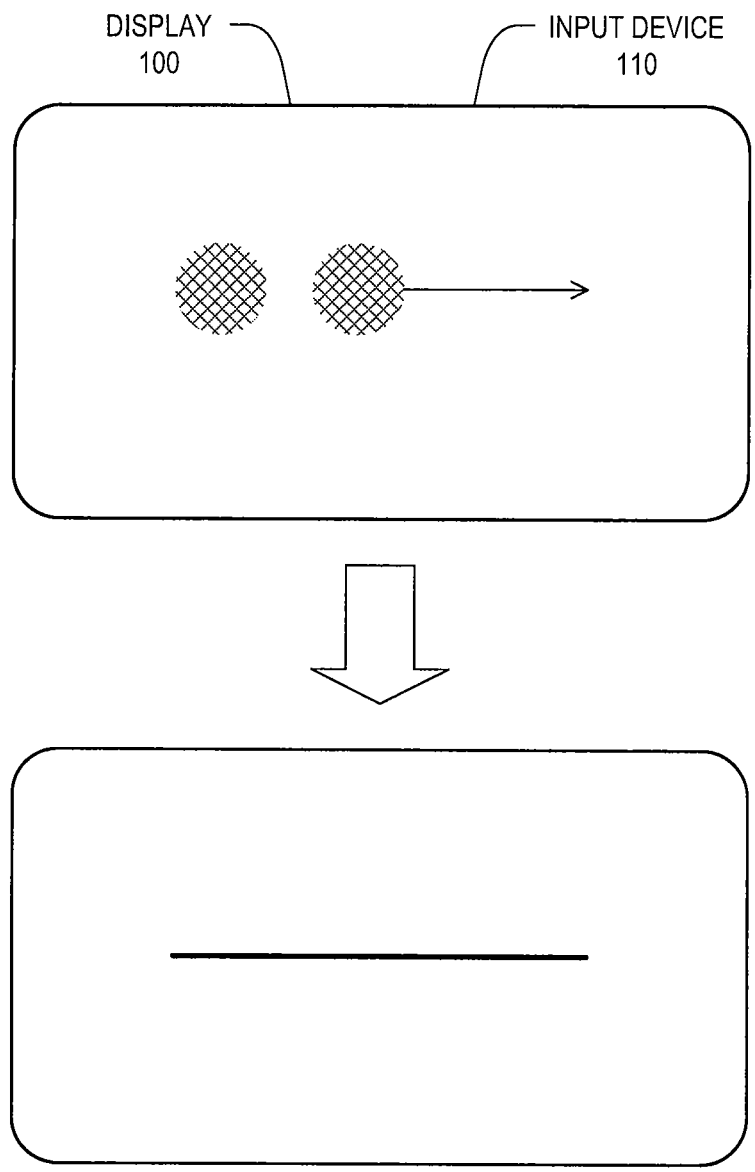
FIGS. 2A-2E illustrate exemplary multi-touch shape generating and modifying gestures associated with a line according to embodiments of the invention.
Figure 2B:
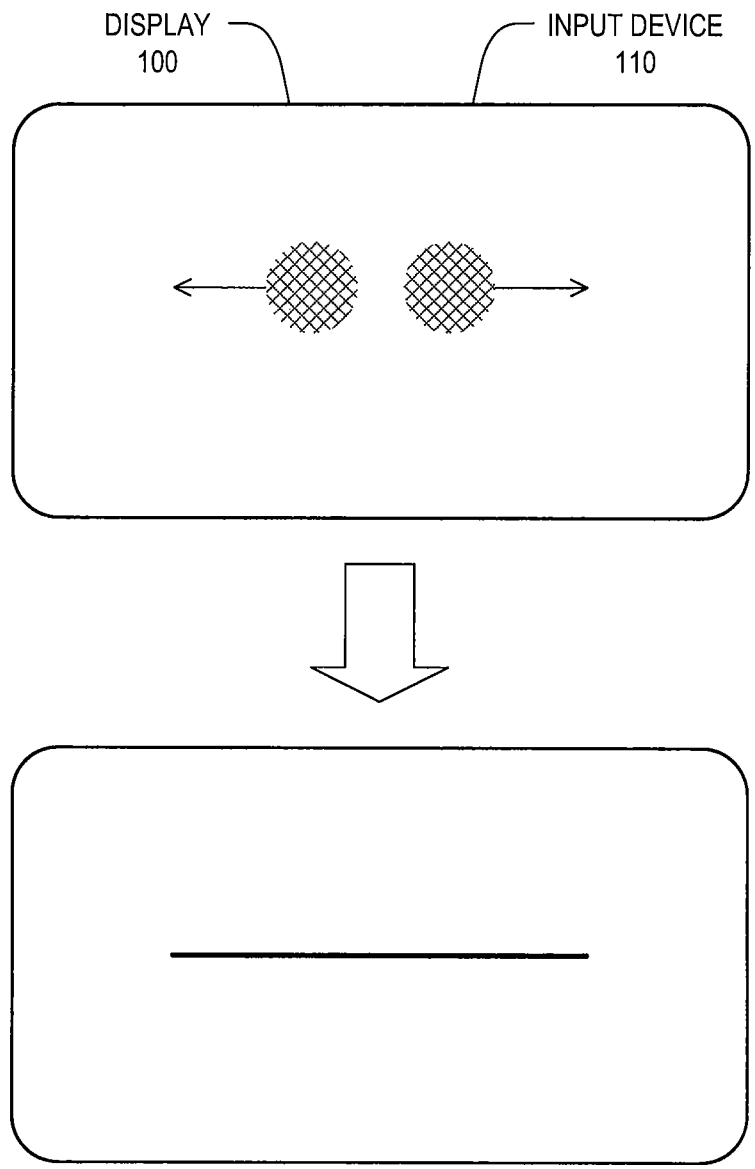

FIGS. 2A-2E illustrate multi-touch shape generating and modifying gestures that can be associated with a line. As illustrated in FIGS. 2A and 2B, a line can be generated in response to a multi-touch gesture comprising a linear expansion motion whereby an expansion motion is detected along an axis. In the embodiment illustrated in FIG. 2A, the linear expansion motion can comprise a first point of contact on the touch-sensitive surface moving away from a stationary second point of contact on the touch-sensitive surface. In the embodiment illustrated in FIG. 2B, the linear expansion motion can comprise two points of contact on the touch-sensitive surface moving away from each other.

Figure 2C:
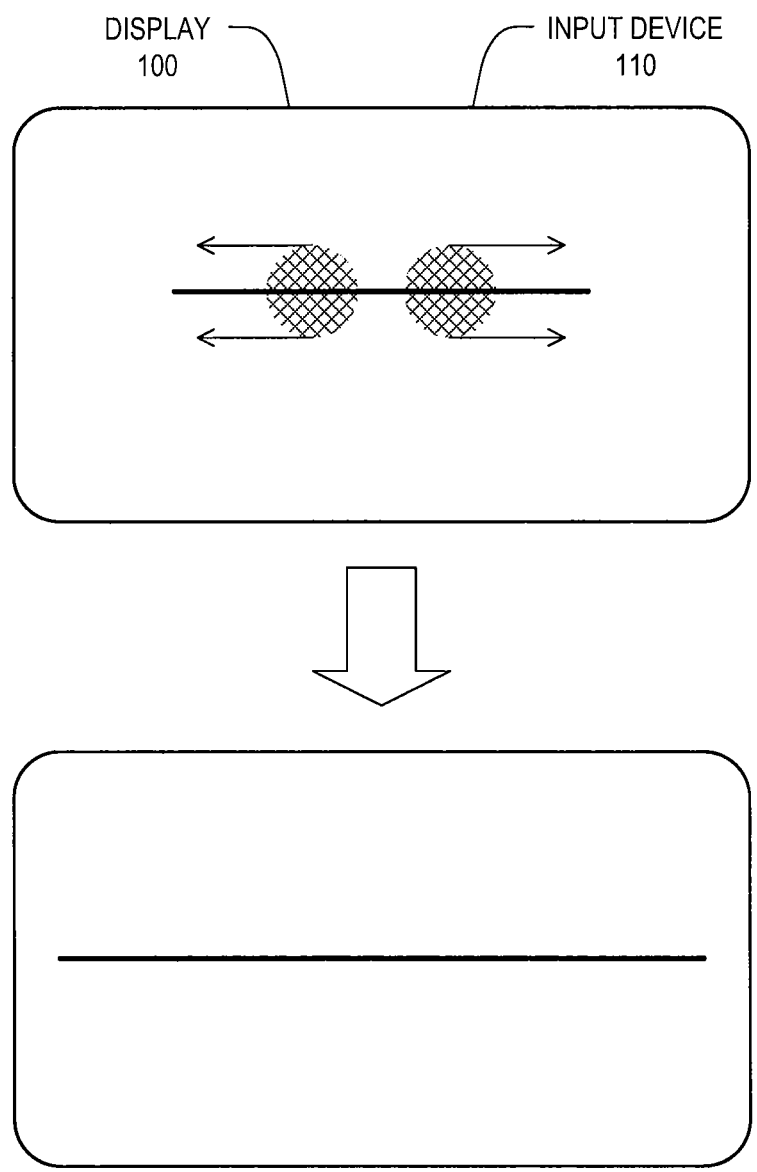
Figure 2D:
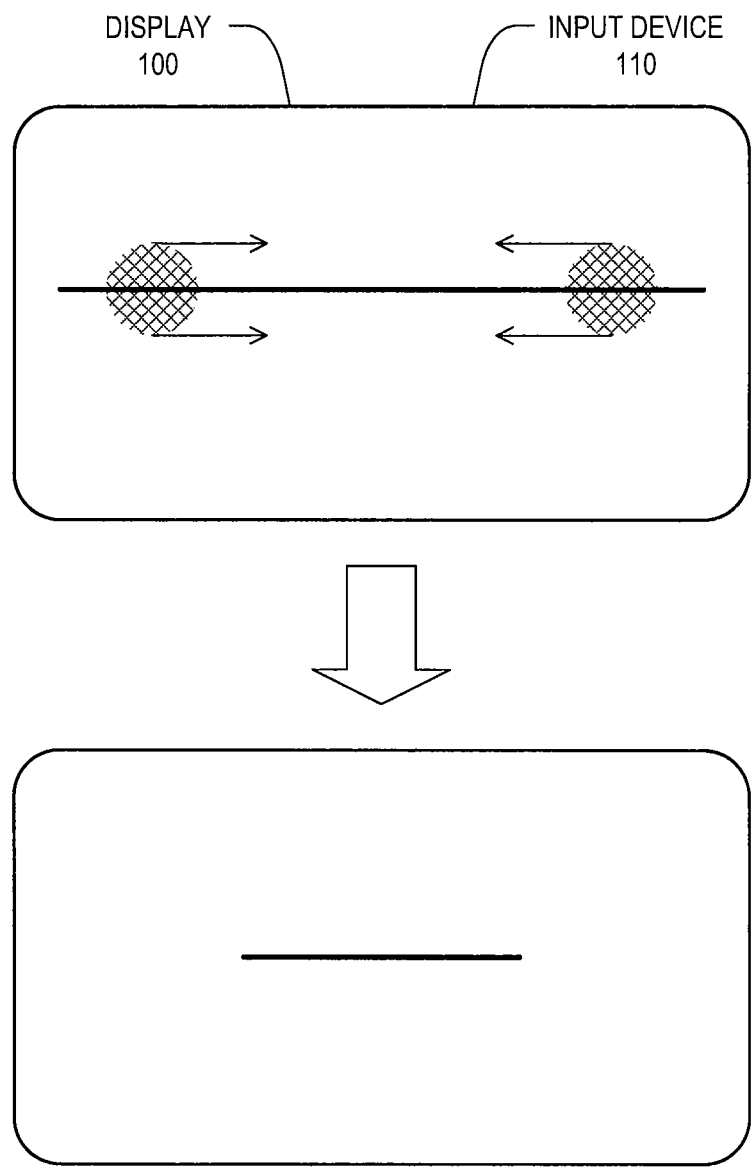
Figure 2E:
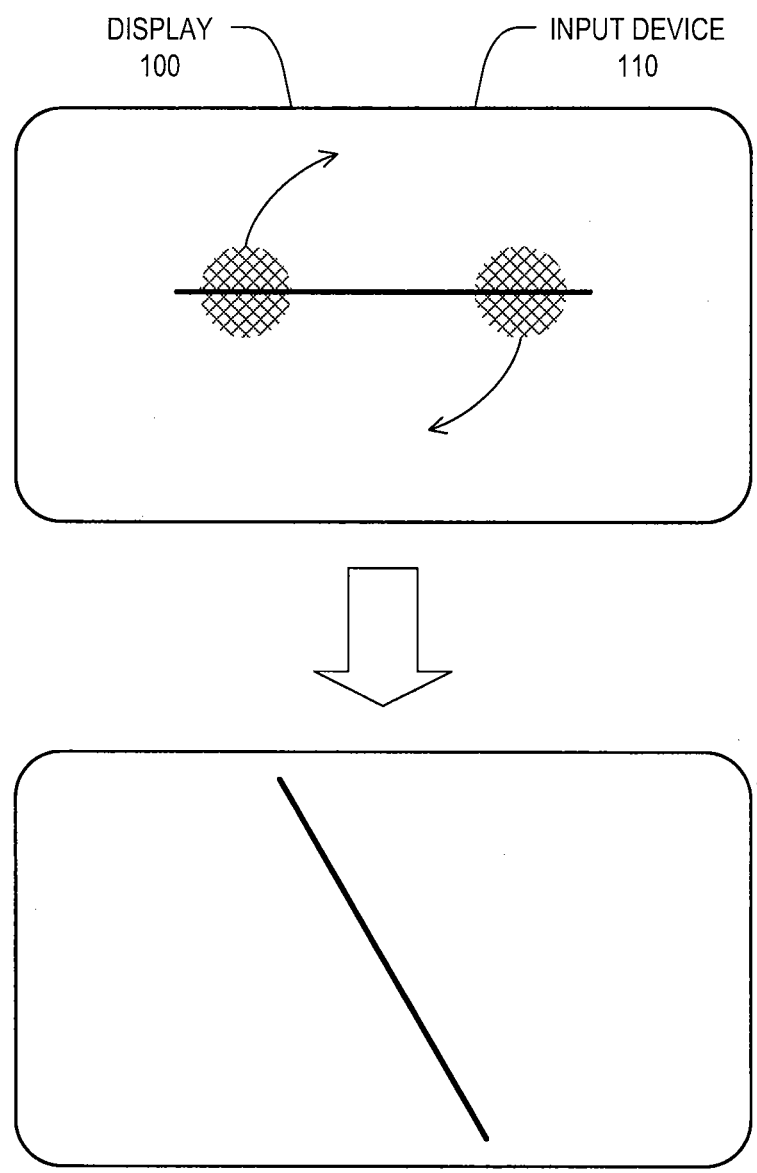

As illustrated in FIGS. 2C-2E, a line can be modified through the use of multi-touch gestures. In the embodiment illustrated in FIG. 2C, the line can be lengthened in response to a multi-touch gesture detected in connection with the line comprising a linear expansion motion along an axis that is aligned with the line to be lengthened. Although FIG. 2C shows two points of contact moving away from each other to lengthen both ends of the line, in other embodiments only one point of contact may move away from the other to lengthen only one end of the line. In the embodiment illustrated in FIG. 2D, the line can be shortened in response to a multi-touch gesture detected in connection with the line comprising a linear contraction motion whereby a contraction motion is detected along an axis that is aligned with the line to be shortened. Although FIG. 2D shows two points of contact moving toward each other to shorten both ends of the line, in other embodiments only one point of contact may move towards the other to shorten only one end of the line. In the embodiment illustrated in FIG. 2E, the line can be rotated about a point or axis in response to a multi-touch gesture comprising a rotational motion detected in connection with the line. Although FIG. 2E shows two points of contact rotating the line about a central point, in other embodiments one or more points of contact may rotate the line about a different point or axis, whether located on the line or apart from the line.

Figure 3A:
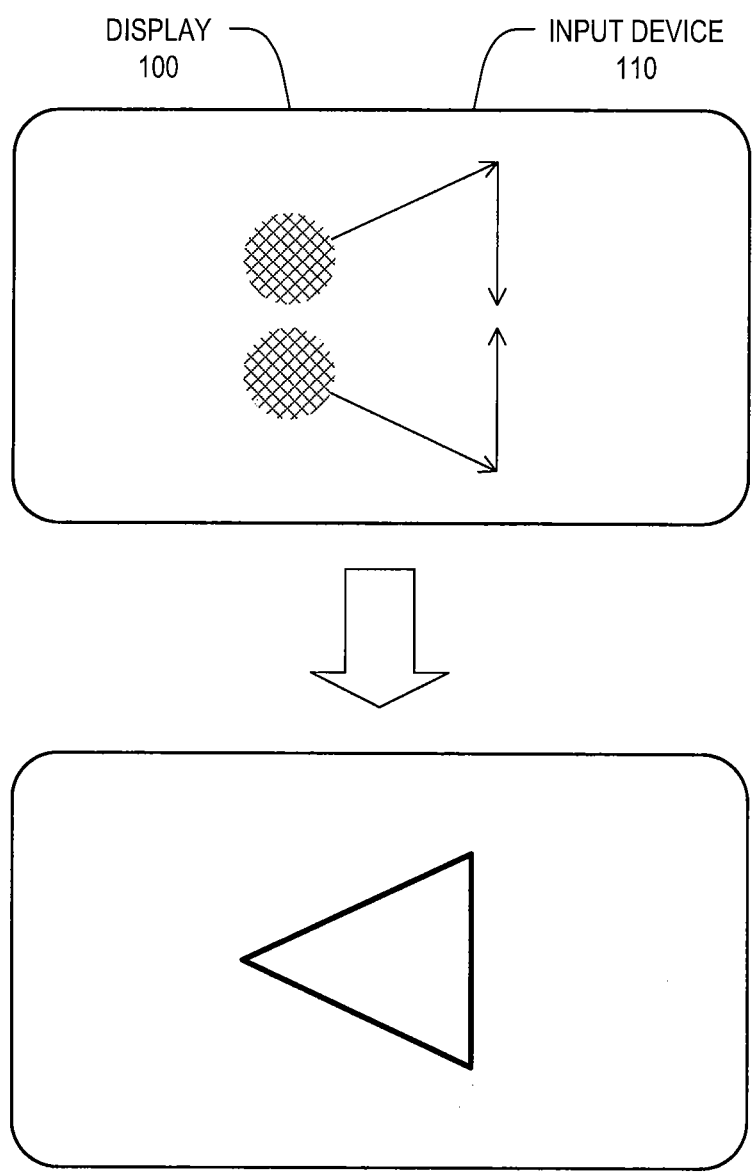
FIGS. 3A-3I illustrate exemplary multi-touch shape generating and modifying gestures associated with a triangle and pyramid according to embodiments of the invention.
Figure 3B:
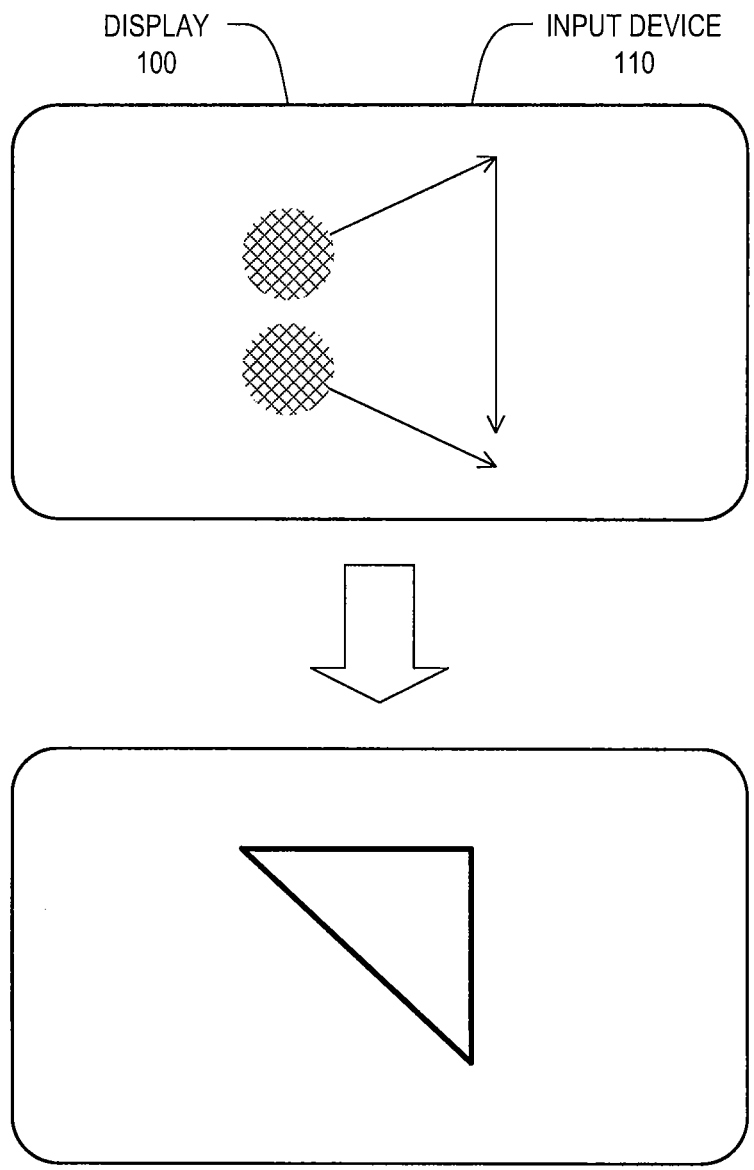
Figure 3C:
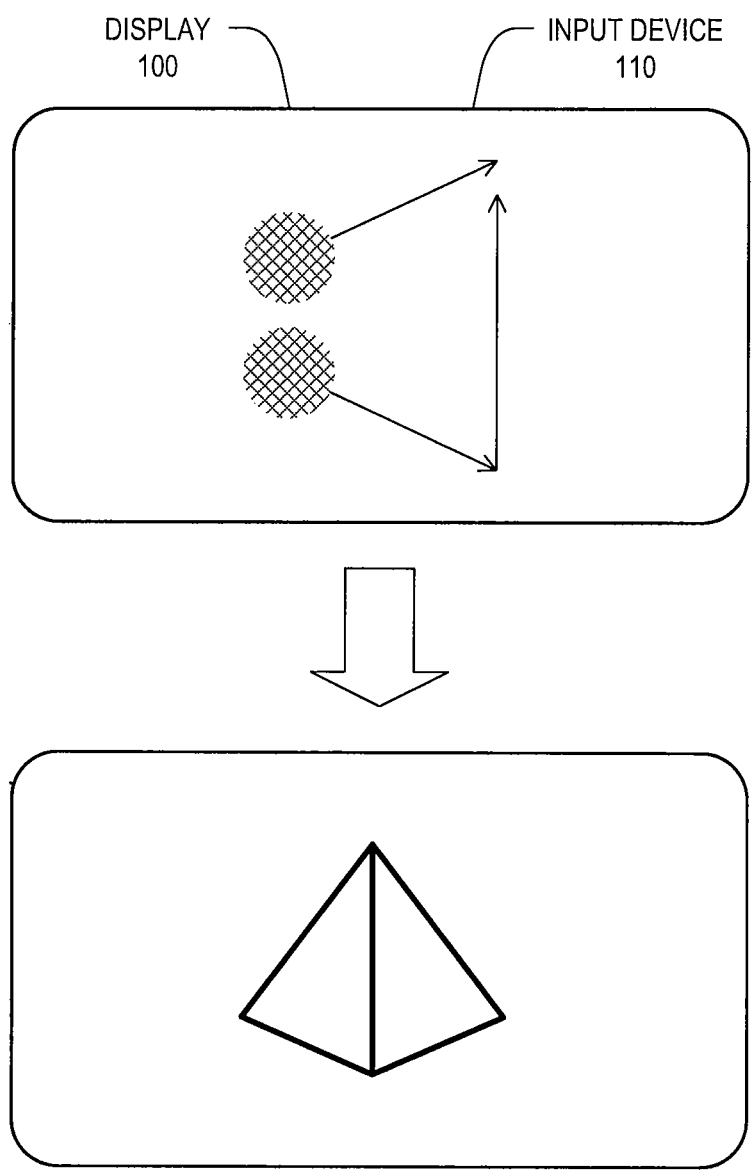

FIGS. 3A-3I illustrate multi-touch shape generating and modifying gestures that can be associated with a triangle and pyramid. As illustrated in FIGS. 3A and 3B, a triangle can be generated in response to a multi-touch gesture detected comprising a lateral expansion motion, whereby an expansion motion is detected along intersecting axes, followed by a linear contraction motion. In the embodiment illustrated in FIG. 3A, the linear contraction motion can comprise two points of contact on the touch-sensitive surface moving toward each other, resulting in the generation of an isosceles triangle, for example. Although FIG. 3A shows a lateral expansion motion produced by each point of contact moving along a non-horizontal path, in other embodiments one of the points of contact can move along a substantially horizontal path. In the embodiment illustrated in FIG. 3B, the linear contraction motion can comprise a first point of contact on the touch-sensitive surface moving toward a stationary second point of contact on the touch-sensitive surface, resulting in the generation of a right triangle, for example. In the embodiment illustrated in FIG. 3C comprising a variant of the linear contraction motion illustrated in FIG. 3B, linear contraction motion occurring in the opposite direction can result in the generation of a pyramid.

Figure 3D:
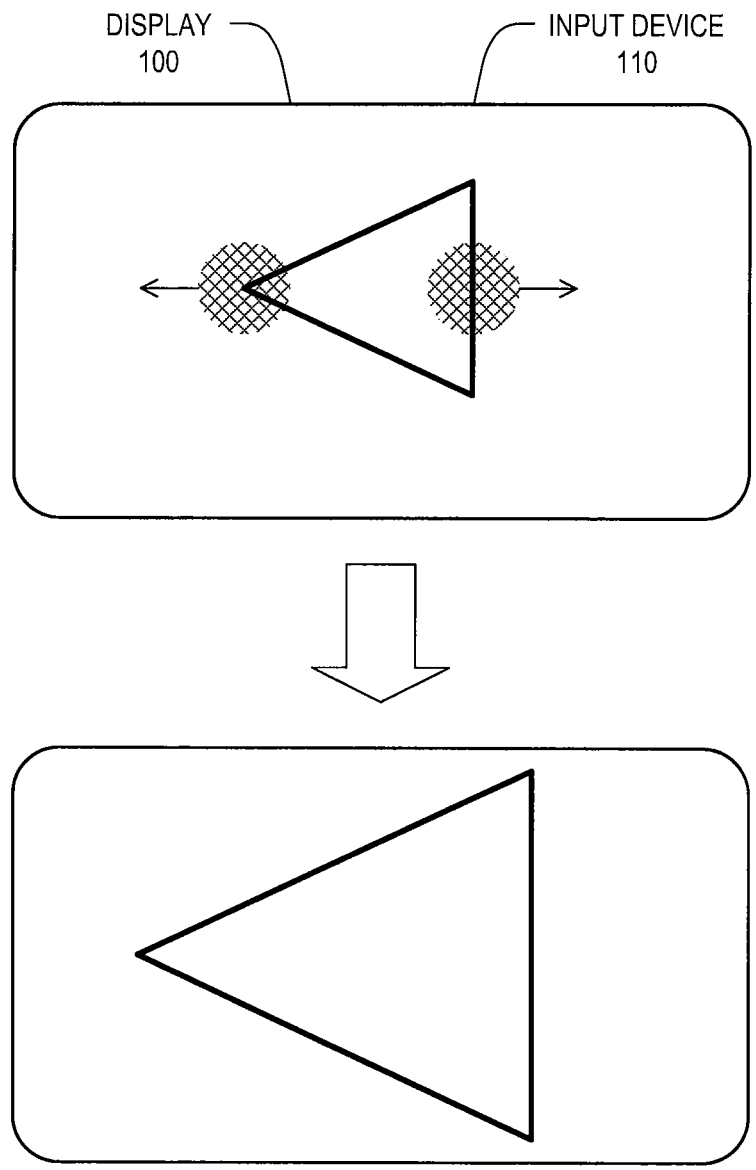
Figure 3E:
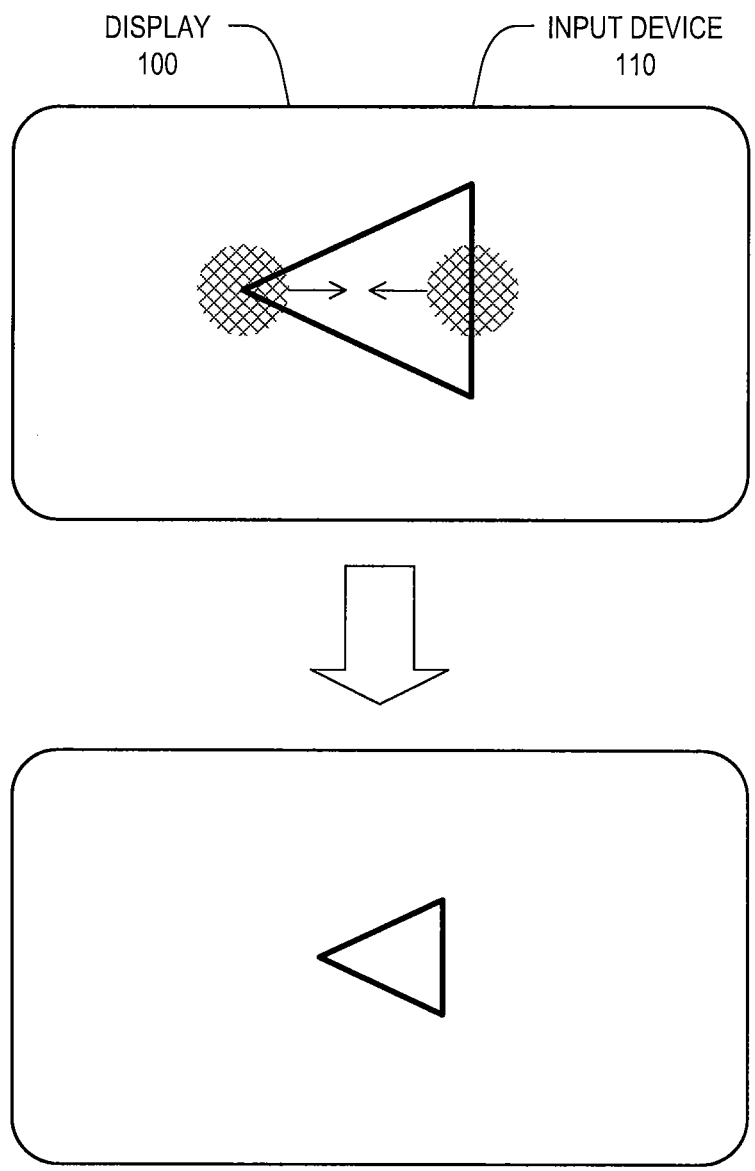
Figure 3F:
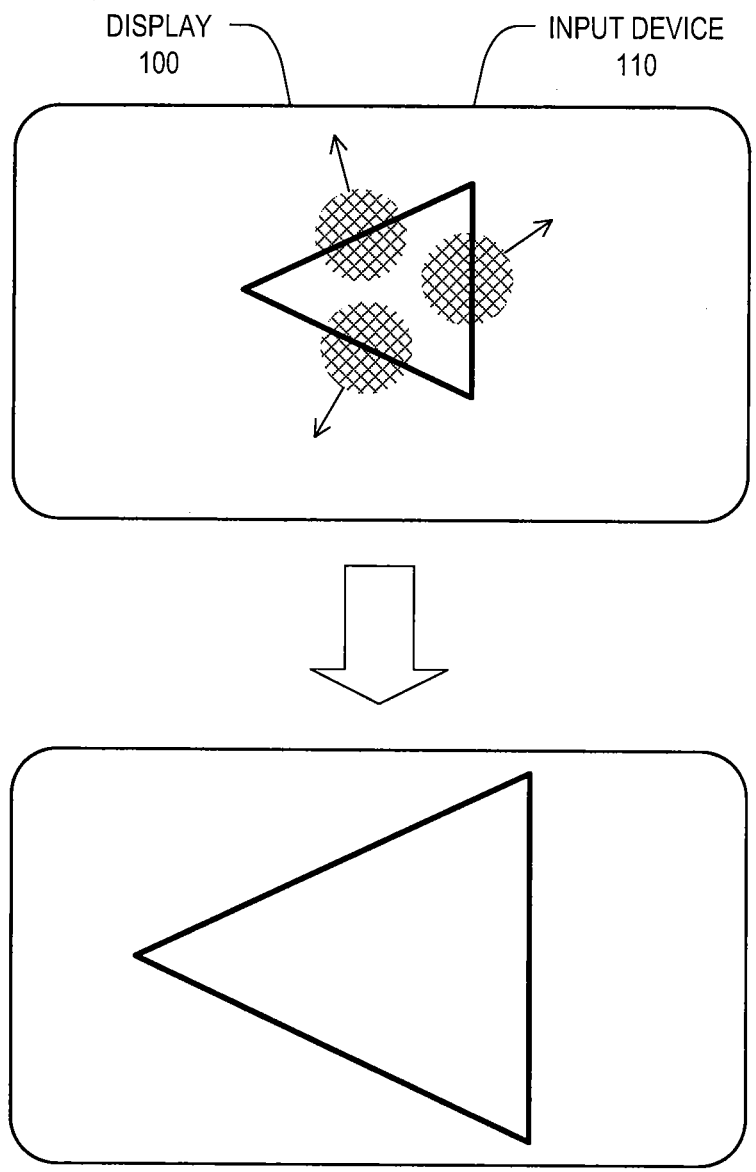
Figure 3G:
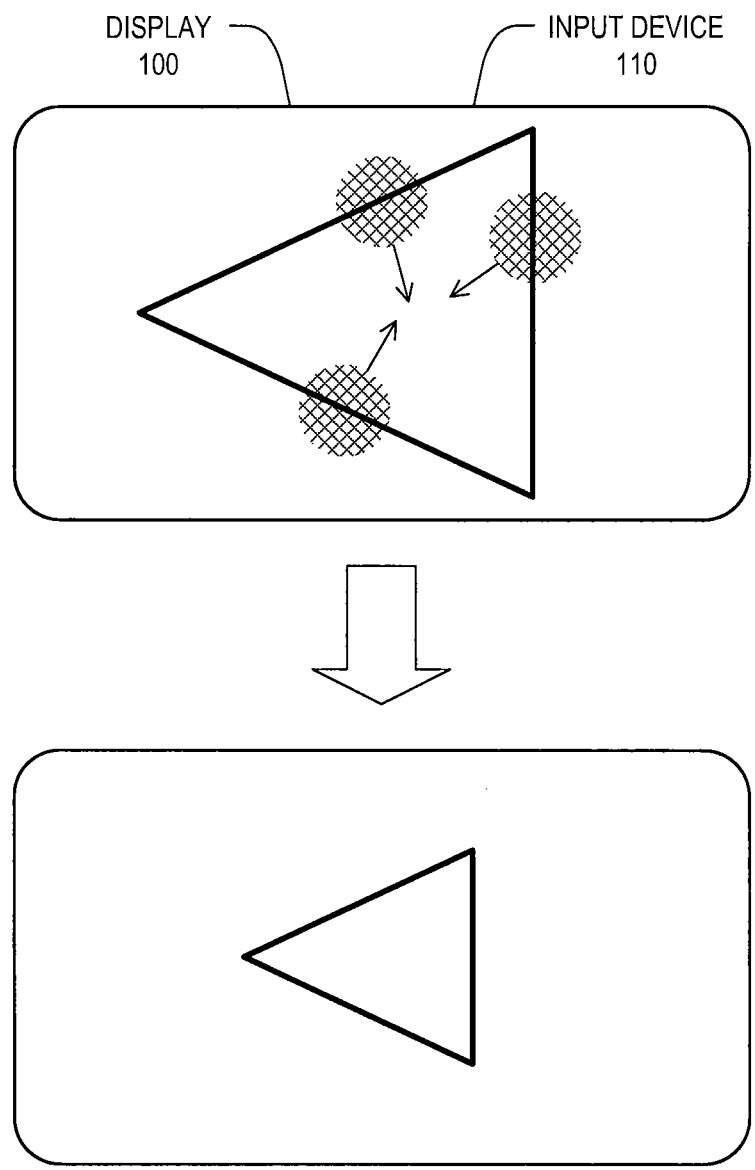

As illustrated in FIGS. 3D-3I, a triangle can be modified through the use of multi-touch gestures. FIGS. 3D and 3E illustrate uniform scaling based on gestures comprising two points of contact, and FIGS. 3F and 3G illustrate uniform scaling based on three points of contact. In the embodiment illustrated in FIG. 3D, the scale of the triangle can be increased uniformly in response to a multi-touch gesture detected in connection with the triangle comprising a linear expansion motion along an axis that is not aligned with any side of the triangle. Although FIG. 3D shows two points of contact moving away from each other to uniformly increase the scale of the triangle, in other embodiments only one point of contact may move away from the other to elongate the triangle without widening it. In the embodiment illustrated in FIG. 3E, the scale of the triangle can be decreased uniformly in response to a multi-touch gesture detected in connection with the triangle comprising a linear contraction motion along an axis that is not aligned with any side of the triangle. Although FIG. 3E shows two points of contact moving toward each other to uniformly decrease the scale of the triangle, in other embodiments only one point of contact may move toward the other to horizontally shorten the triangle without decreasing its height. In the embodiment illustrated in FIG. 3F, the scale of the triangle can be increased uniformly in response to a multi-touch gesture detected in connection with the triangle comprising a three point expansion motion. Although FIG. 3F shows three points of contact moving away from each other to uniformly increase the scale of the triangle, in other embodiments one or two of the points of contact may move away from the others to lengthen the sides of the triangle and expand the triangle in the direction(s) of motion. In the embodiment illustrated in FIG. 3G, the scale of the triangle can be decreased uniformly in response to a multi-touch gesture detected in connection with the triangle comprising a three-point contraction motion. Although FIG. 3G shows three points of contact moving toward each other to uniformly decrease the scale of the triangle, in other embodiments one or two of the points of contact may move toward the others to shorten the sides of the triangle and shrink the triangle in the direction(s) of motion.

Figure 3H:
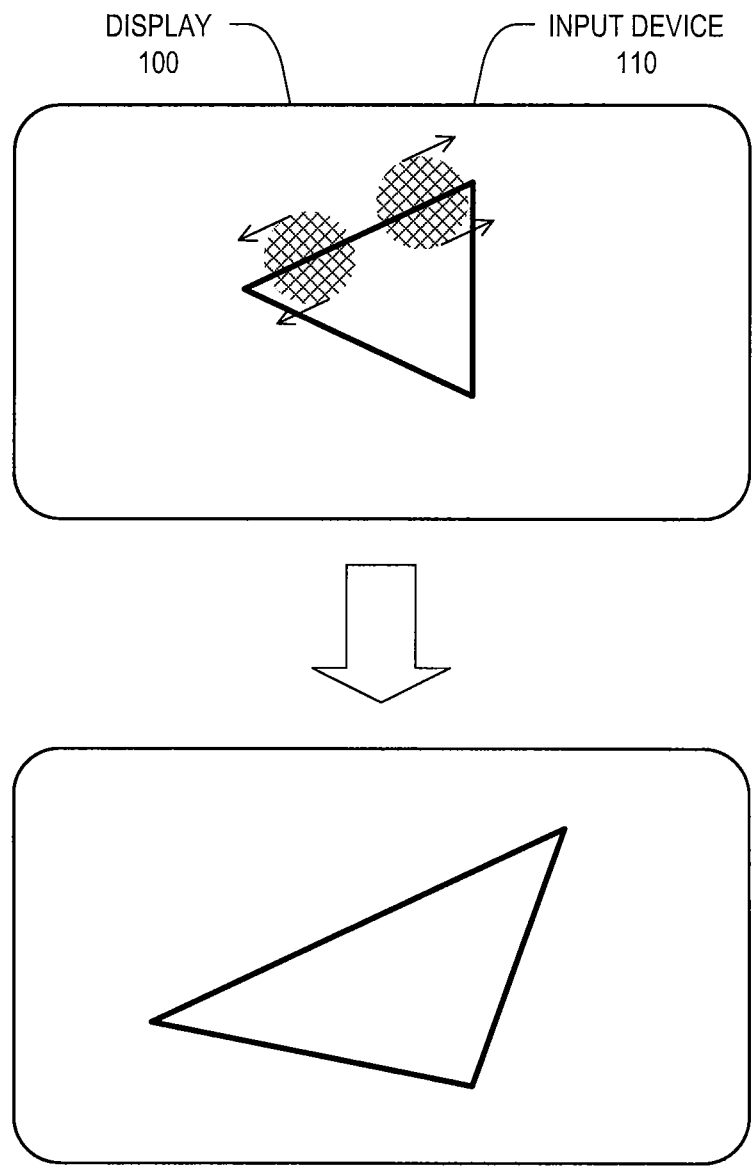
Figure 3I:
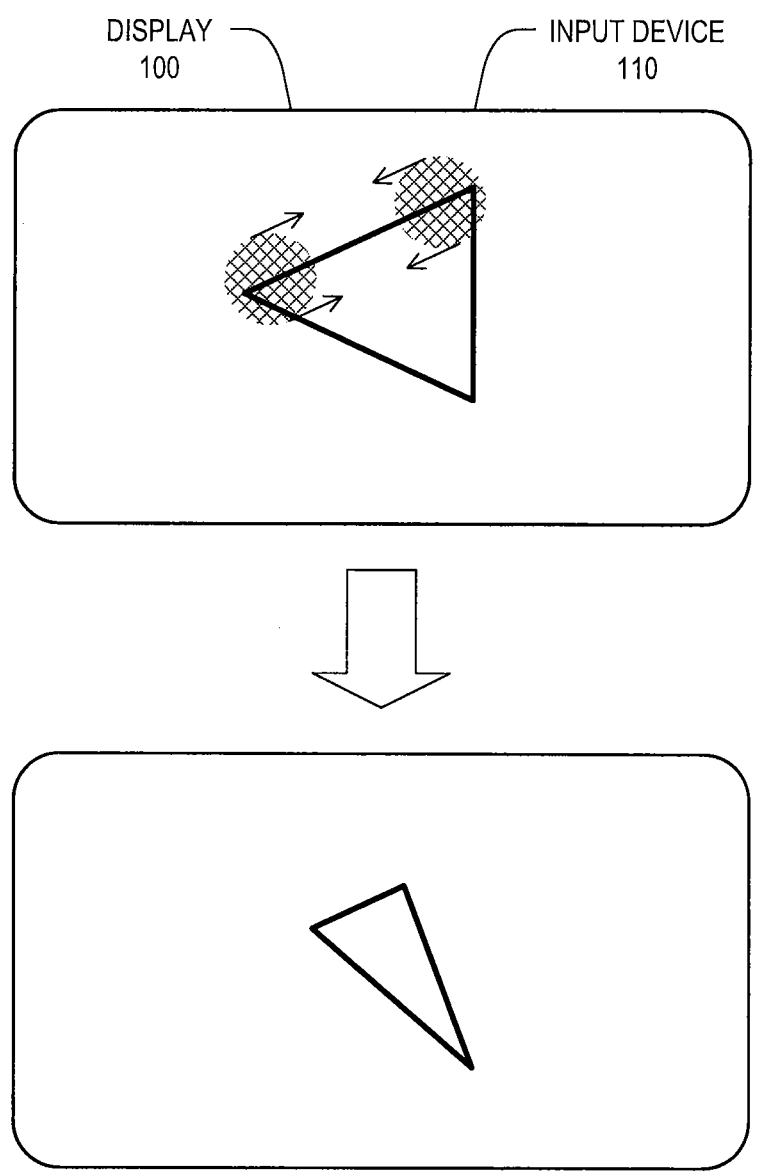

FIGS. 3H and 3I illustrate scaling of one particular dimension (e.g., a side) of the displayed shape. In the embodiment illustrated in FIG. 3H, one side of the triangle can be lengthened at both ends in response to a multi-touch gesture detected in connection with the triangle comprising a linear expansion motion along an axis that is aligned with the side of the triangle to be lengthened. (It is understood that when both ends of one side of the triangle are lengthened, the other two sides of the triangle will be lengthened as well.) Although FIG. 3H shows two points of contact moving away from each other to lengthen one side of the triangle, in other embodiments only one point of contact may move away from the other to lengthen two sides of the triangle and expand the triangle in the direction of motion. In the embodiment illustrated in FIG. 3I, one side of the triangle can be shortened at both ends in response to a multi-touch gesture detected in connection with the triangle comprising a linear contraction motion along an axis that is aligned with the side of the triangle to be shortened. (It is understood that when both ends of one side of the triangle are shortened, the other two sides of the triangle will be shortened as well.) Although FIG. 3H shows two points of contact moving toward each other to shorten one side of the triangle, in other embodiments only one point of contact may move toward the other to shorten two sides of the triangle and shrink the triangle in the direction of motion. The triangle can also be rotated (not shown) in a manner similar to that which is illustrated in FIG. 2E (e.g., in response to a multi-touch gesture comprising a rotational motion). Additional multi-touch gestures can be used to rotate three-dimensional shapes along their different axes.

Figure 4A:
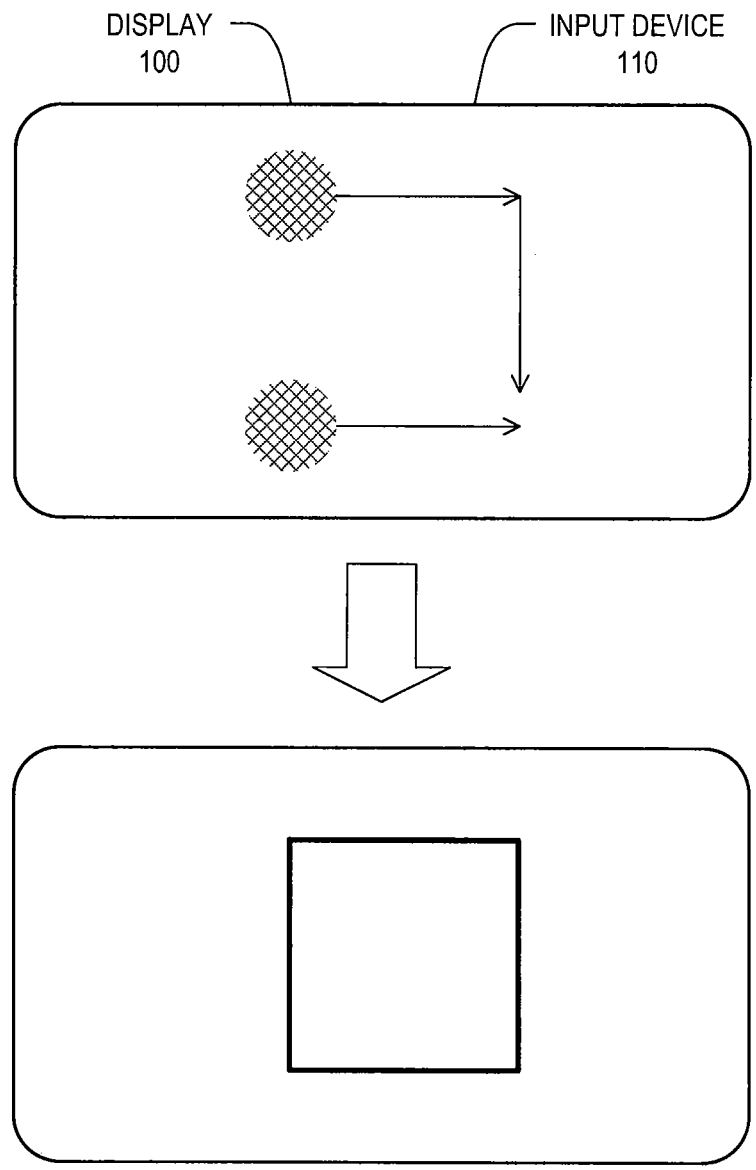
FIGS. 4A-4B illustrate exemplary multi-touch shape generating gestures associated with a square and cube according to embodiments of the invention.
Figure 4B:
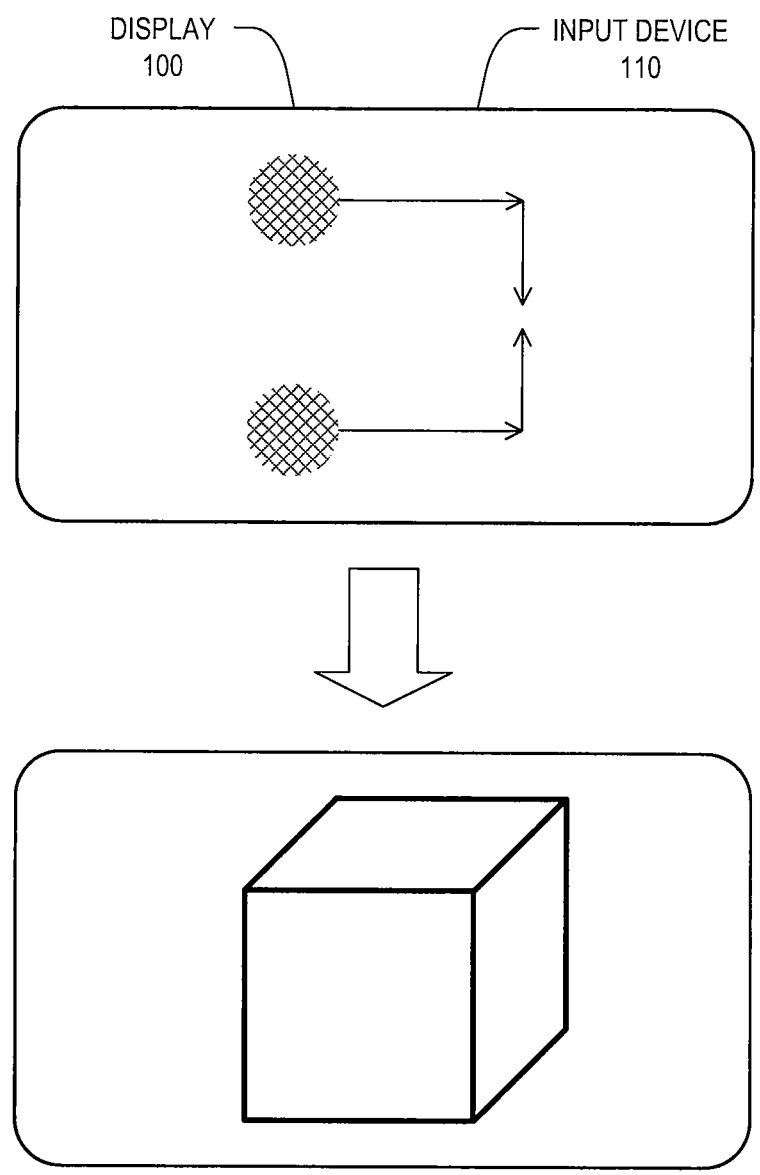

FIGS. 4A-4B illustrate multi-touch shape generating gestures that can be associated with a square and cube. As illustrated in FIGS. 4A and 4B, squares and cubes can be generated in response to a multi-touch gesture comprising a parallel dual swipe motion, whereby two swipe motions substantially parallel to one another are detected, followed by a linear contraction motion. In the embodiment illustrated in FIG. 4A, the linear contraction motion can comprise a first point of contact on the touch-sensitive surface moving toward a stationary second point of contact on the touch-sensitive surface, resulting in the generation of a square. In the embodiment illustrated in FIG. 4B, the linear contraction motion can comprise two points of contact on the touch-sensitive surface moving toward each other, resulting in the generation of a cube. Scaling and rotation can be implemented in manners similar to those illustrated in the foregoing embodiments (e.g., in response to multi-touch gestures comprising expansion/contraction motions and rotational motion).

Figure 5A:
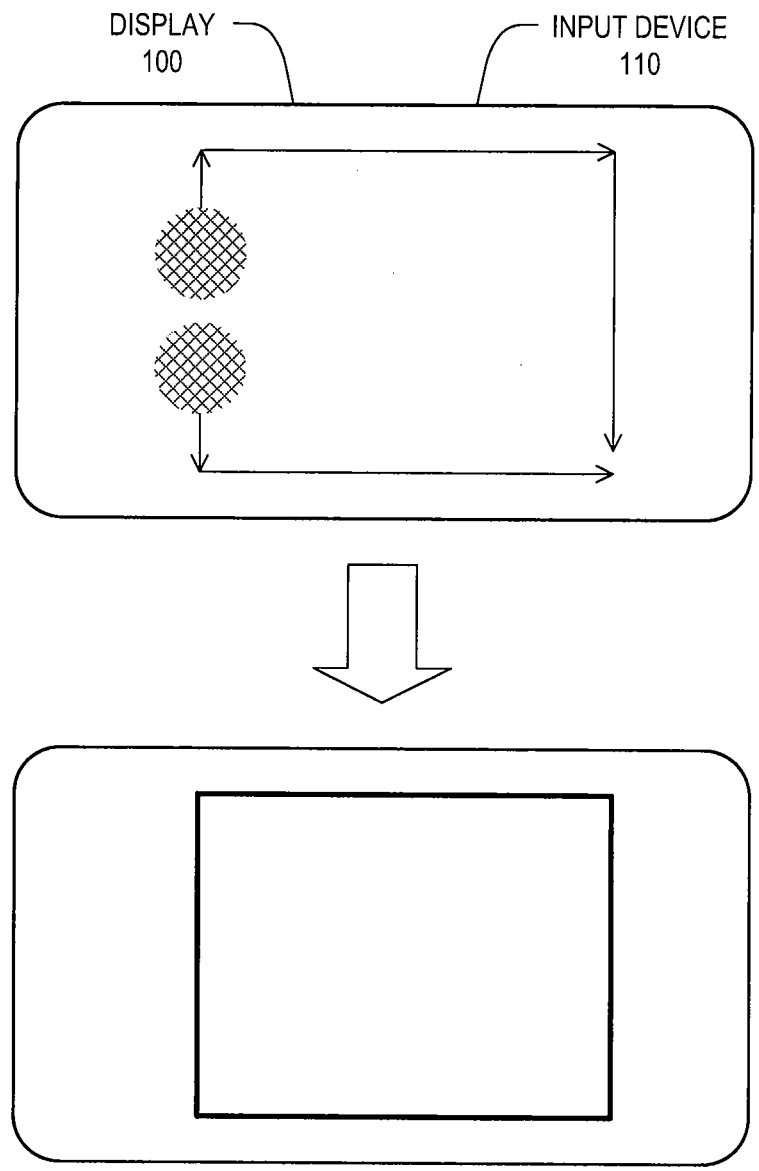
FIGS. 5A-5B illustrate exemplary multi-touch shape generating gestures associated with a rectangle and box according to embodiments of the invention.
Figure 5B:
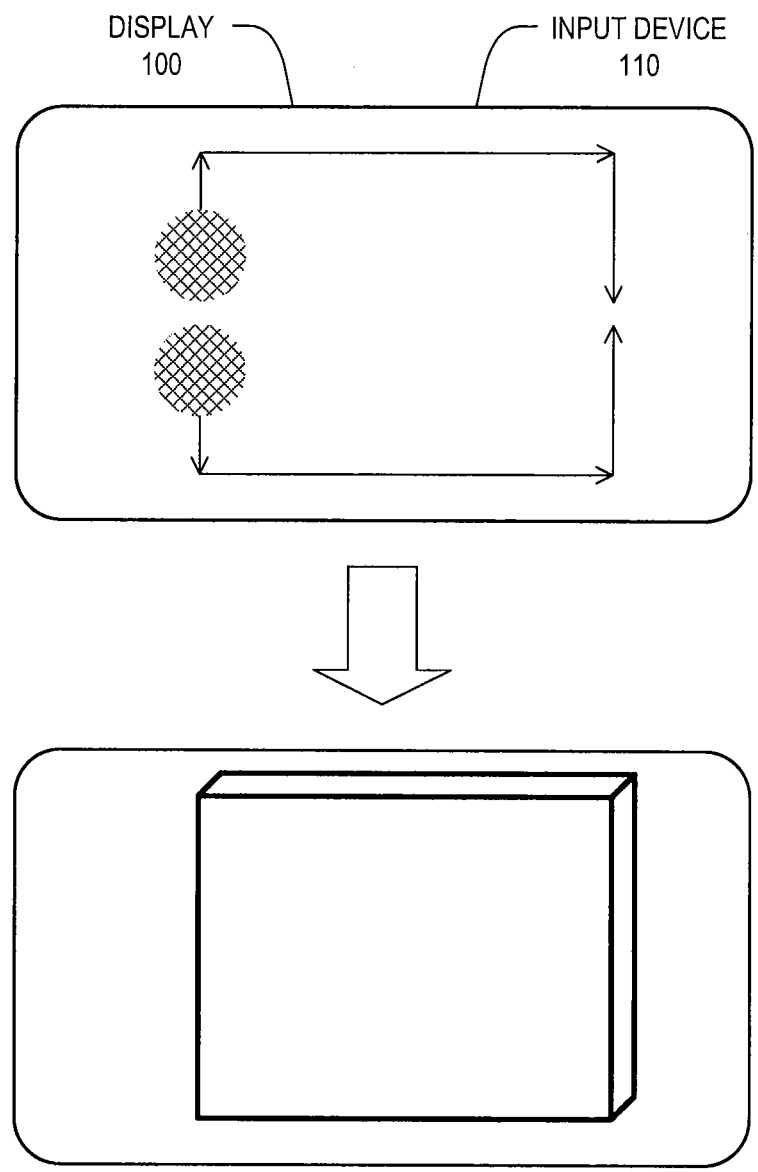

FIGS. 5A-5B illustrate multi-touch shape generating gestures that can be associated with a rectangle and box. As illustrated in FIGS. 5A and 5B, rectangles and boxes can be generated in response to a multi-touch gesture comprising a linear expansion motion followed by a parallel dual swipe motion followed by a linear contraction motion. In the embodiment illustrated in FIG. 5A, the linear contraction motion can comprise a first point of contact on the touch-sensitive surface moving toward a stationary second point of contact on the touch-sensitive surface, resulting in the generation of a rectangle. In the embodiment illustrated in FIG. 5B, the linear contraction motion can comprise two points of contact on the touch-sensitive surface moving toward each other, resulting in the generation of a box. Scaling and rotation can be implemented in manners similar to those illustrated in the foregoing embodiments (e.g., in response to multi-touch gestures comprising expansion/contraction motions and rotational motion).

Figure 6A:
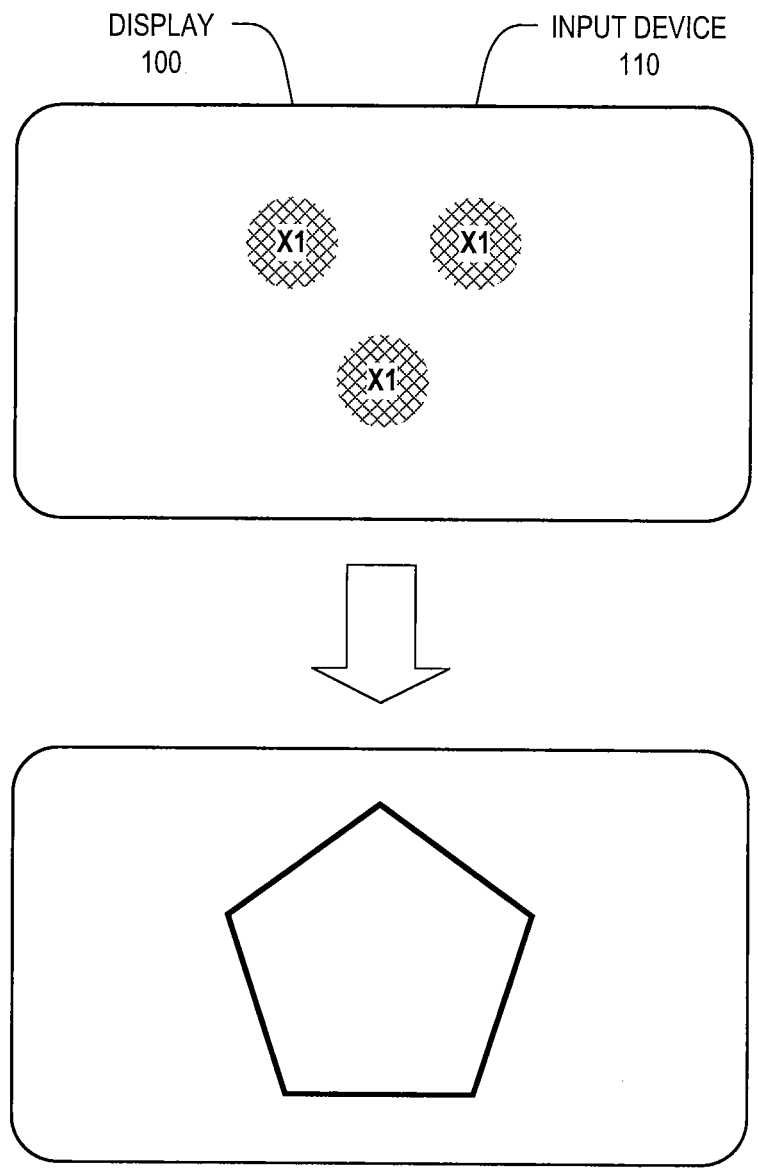
FIGS. 6A-6B illustrate exemplary multi-touch shape generating gestures associated with polygons with more than four sides according to embodiments of the invention.
Figure 6B:
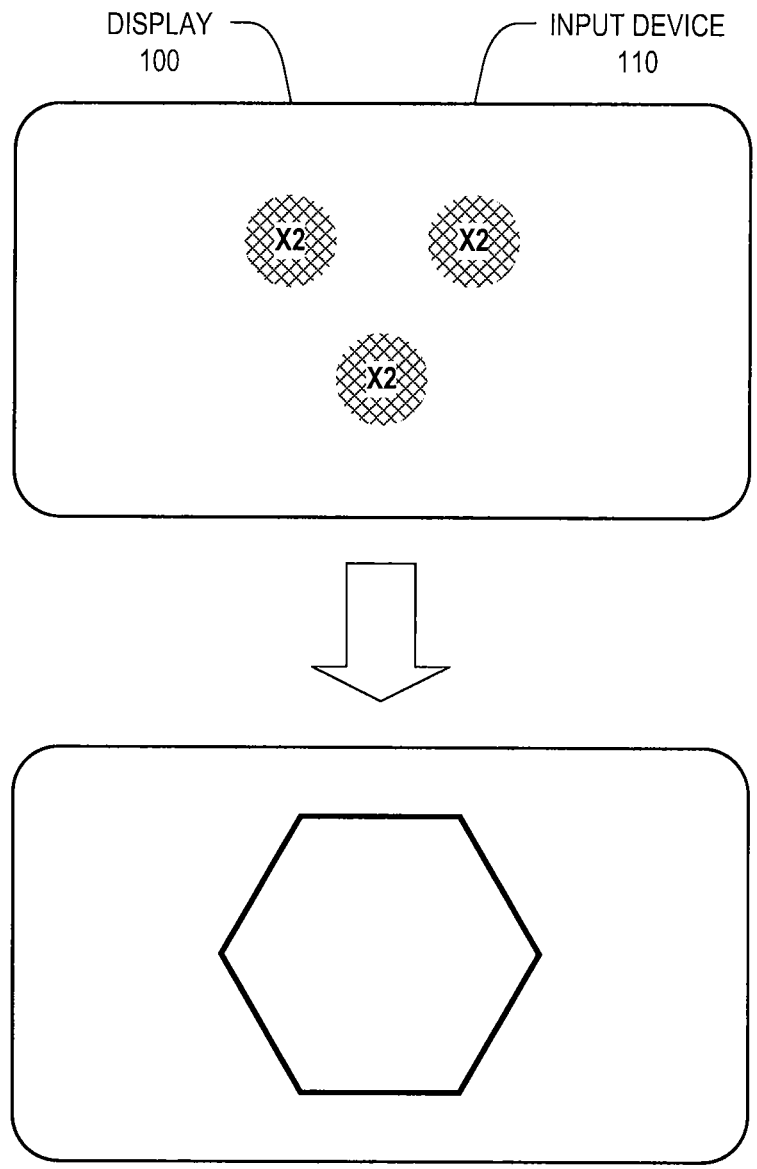

FIGS. 6A-6B illustrate multi-touch shape generating gestures that can be associated with polygons with more than four sides. As illustrated in FIGS. 6A and 6B, polygons can be generated in response to a multi-touch gesture comprising one or more n-point taps where n>1, wherein the number of the n-point taps determines the number of sides of the polygon to be generated. In the embodiment illustrated in FIG. 6A, a single three-point tap on the touch-sensitive surface can result in the generation of a five-sided polygon (i.e. a pentagon). In the embodiment illustrated in FIG. 6B, two three-point taps on the touch-sensitive surface can result in the generation of a six-sided polygon (i.e., a hexagon). Any suitable relationship may define which number of n-point taps (e.g., one or more) forms a polygon with a particular number (e.g., one or more) of sides. Scaling and rotation can be implemented in manners similar to those illustrated in the foregoing embodiments (e.g., in response to multi-touch gestures comprising expansion/contraction motions and rotational motion).

Figure 7A:
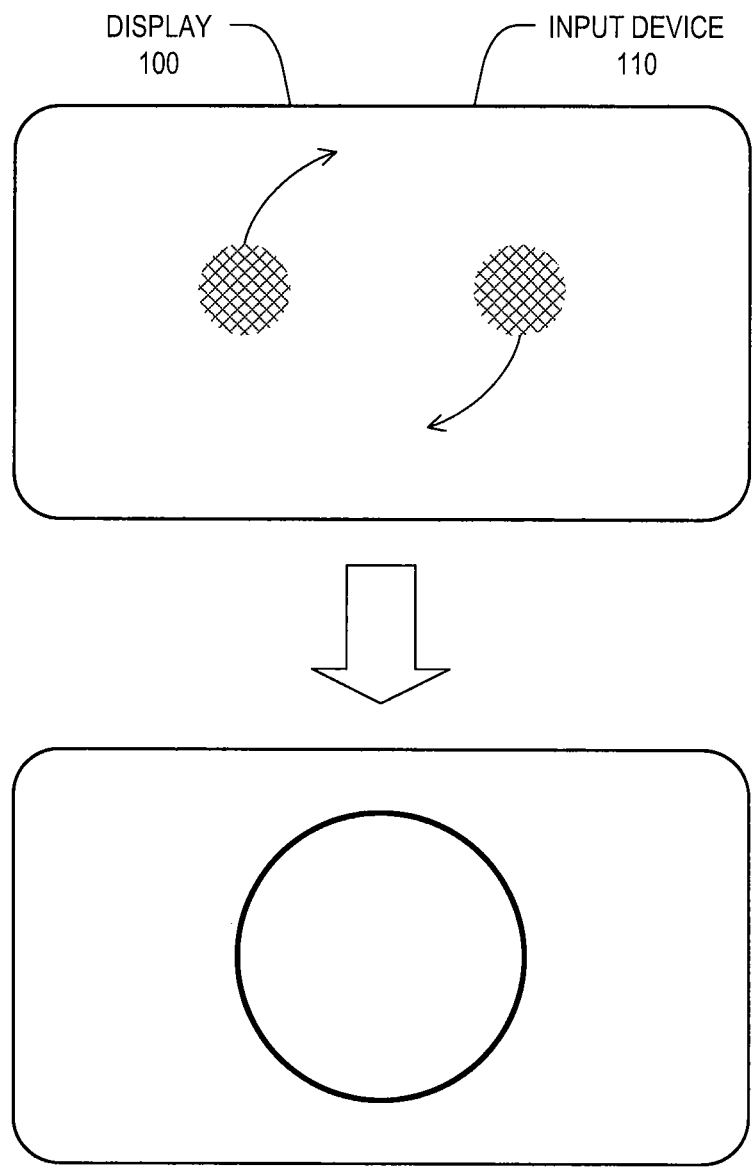
FIGS. 7A-7B illustrate exemplary multi-touch shape generating gestures associated with a circle and sphere according to embodiments of the invention.
Figure 7B:
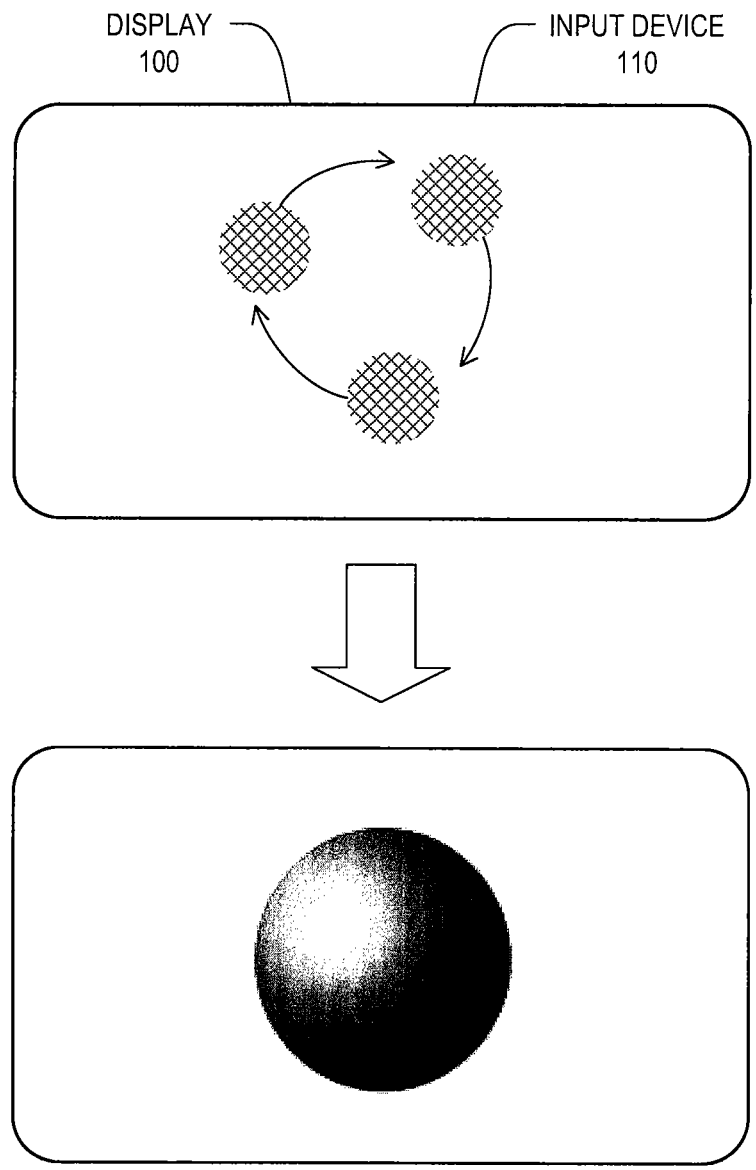

FIGS. 7A-7B illustrate multi-touch shape generating gestures that can be associated with a circle and sphere. As illustrated in FIGS. 7A and 7B, circles and spheres can be generated in response to a multi-touch gesture comprising an n-point curvilinear motion about a central point where n>1 and the n points are approximately equidistant from the central point. In the embodiment illustrated in FIG. 7A, a two-point curvilinear motion about a central point can result in the generation of a circle. In the embodiment illustrated in FIG. 7B, a three-point curvilinear motion about a central point can result in the generation of a sphere. Scaling can be implemented in a manner similar to that illustrated in the foregoing embodiments (e.g., in response to multi-touch gestures comprising expansion/contraction motions).

Figure 8:
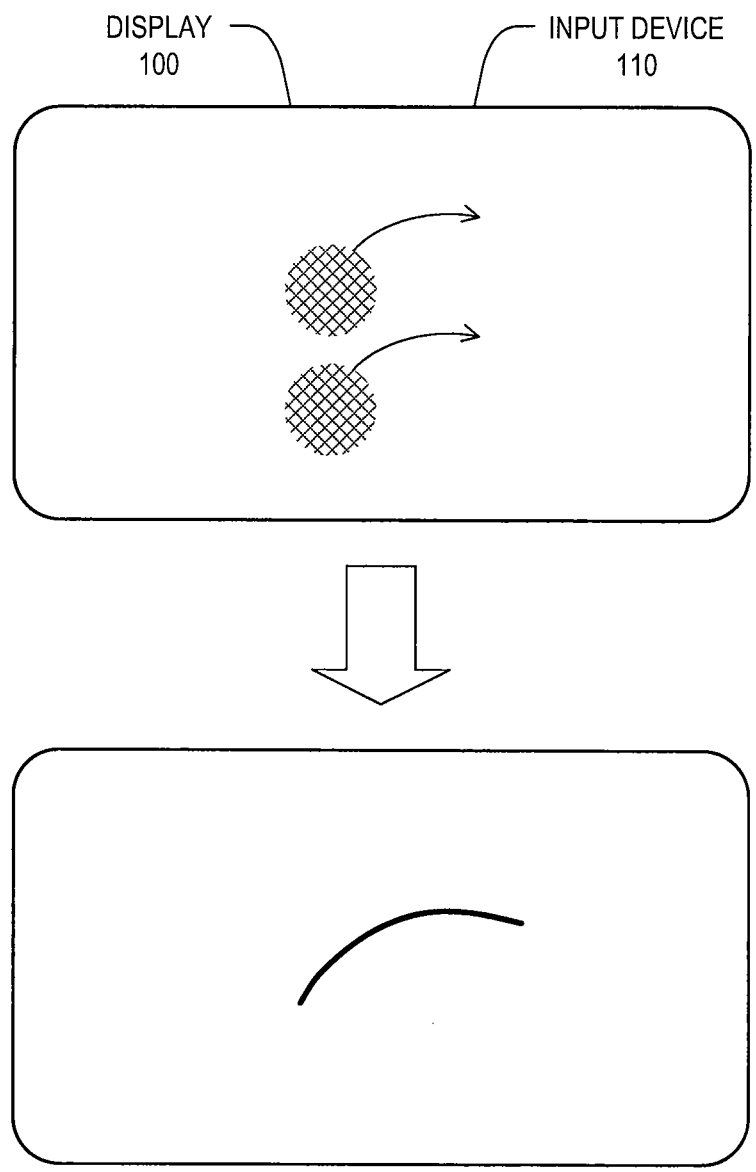
FIG. 8 illustrates an exemplary multi-touch shape generating gesture associated with an arc according to an embodiment of the invention.

FIG. 8 illustrates a multi-touch shape generating gesture that can be associated with an arc. As illustrated in FIG. 8, an arc can be generated in response to a multi-touch gesture comprising an n-point parallel curvilinear motion, wherein curvilinear motions substantially parallel to one another are detected, where n>1. In the embodiment illustrated in FIG. 8, a two-point parallel curvilinear motion can result in the generation of an arc. Scaling and rotation can be implemented in manners similar to those illustrated in the foregoing embodiments (e.g., in response to multi-touch gestures comprising expansion/contraction motions and rotational motion).

The multi-touch gestures disclosed in the foregoing embodiments are not limited to the generation of the disclosed shapes and the disclosed shape modifications. Rather, any suitable shape generation or shape modification may be implemented in response to the disclosed multi-touch gestures or any suitable multi-touch gesture. Further, the generation of shapes and the shape modifications disclosed in the foregoing embodiments are not limited to the disclosed gestures. Rather, any suitable multi-touch gesture may generate the disclosed shapes or any suitable shape, and implement the disclosed shape modifications or any suitable shape modification.

Figure 9:
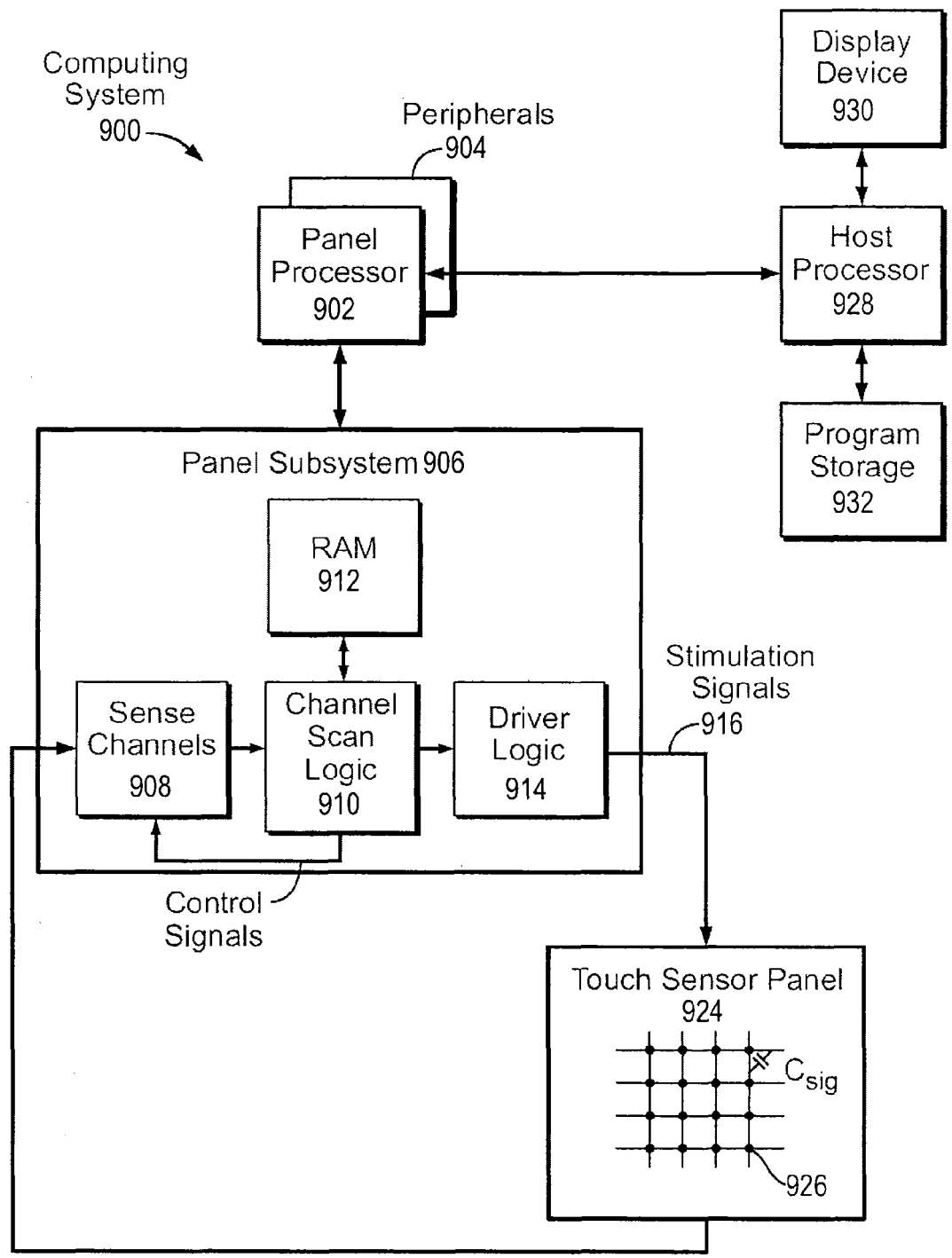
FIG. 9 illustrates an exemplary computing system including a multi-touch sensor panel according to embodiments of the invention

FIG. 9 illustrates exemplary computing system 900 that can include one or more of the embodiments of the invention described above. Computing system 900 can include one or more panel processors 902 and peripherals 904, and panel subsystem 906 associated with an input device (which may correspond to input device 110). Peripherals 904 can include, but are not limited to, random access memory (RAM) or other types of memory or storage, watchdog timers and the like. Panel subsystem 906 can include, but is not limited to, one or more sense channels 908, channel scan logic 910 and driver logic 914. Channel scan logic 910 can access RAM 912, autonomously read data from the sense channels and provide control for the sense channels. In addition, channel scan logic 910 can control driver logic 914 to generate stimulation signals 916 at various frequencies and phases that can be selectively applied to drive lines of touch sensor panel 924. In some embodiments, panel subsystem 906, panel processor 902 and peripherals 904 can be integrated into a single application specific integrated circuit (ASIC).

Touch sensor panel 924 can include a capacitive sensing medium having a plurality of drive lines and a plurality of sense lines, although other sensing media can also be used. Each intersection of drive and sense lines can represent a capacitive sensing node and can be viewed as picture element (pixel) 926, which can be particularly useful when touch sensor panel 924 is viewed as capturing an "image" of touch. In other words, after panel subsystem 906 has determined whether a touch event has been detected at each touch sensor in the touch sensor panel, the pattern of touch sensors in the multi-touch panel at which a touch event occurred can be viewed as an "image" of touch (e.g., a pattern of fingers touching the panel). Each sense line of touch sensor panel 924 can drive sense channel 908 in panel subsystem 906. The touch sensor panel can enable multi-touch gesture detection so that shapes can be generated and modified according to embodiments of the invention.

Computing system 900 can also include host processor 928 for receiving outputs from panel processor 902 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 928 can also perform additional functions that may not be related to panel processing, and can be coupled to program storage 932 and display device 930 (which may correspond to display 100) such as an LCD display for providing a UI to a user of the device. Display device 930 together with touch sensor panel 924, when located partially or entirely under the touch sensor panel, can form touch screen 918.

Note that one or more of the functions described above can be performed by firmware stored in memory (e.g. one of the peripherals 904 in FIG. 9) and executed by panel processor 902, or stored in program storage 932 and executed by host processor 928. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 10A:
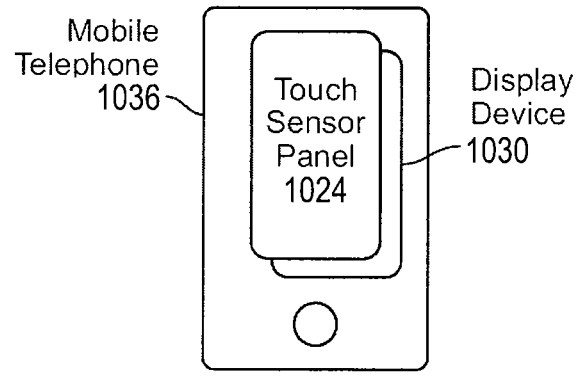
FIG. 10A illustrates an exemplary mobile telephone having a multi-touch sensor panel according to embodiments of the invention.

FIG. 10A illustrates exemplary mobile telephone 1036 that can include touch sensor panel 1024 and display device 1030, with the touch sensor panel being configured to enable multi-touch shape drawing according to embodiments of the invention.

Figure 10B:
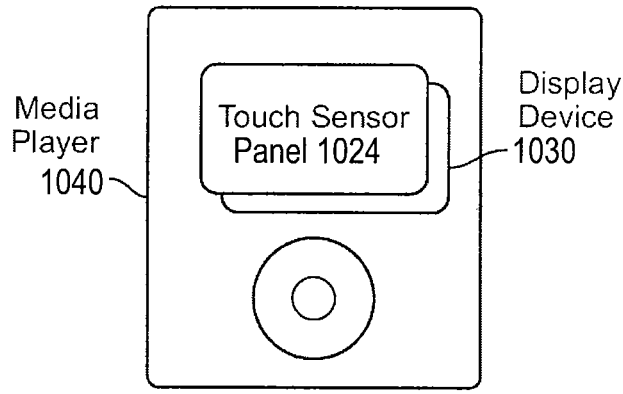
FIG. 10B illustrates an exemplary digital media player having a multi-touch sensor panel according to embodiments of the invention.

FIG. 10B illustrates exemplary digital media player 1040 that can include touch sensor panel 1024 and display device 1030, with the touch sensor panel being configured to enable multi-touch shape drawing according to embodiments of the invention.

Figure 10C:
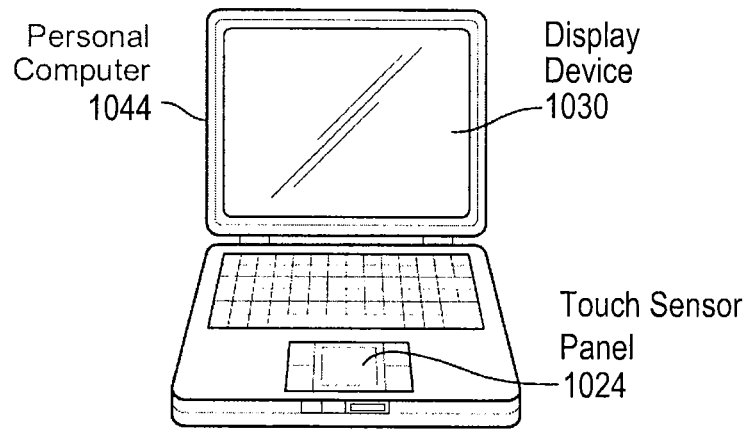
FIG. 10C illustrates an exemplary personal computer having a multi-touch sensor panel (trackpad) and/or display according to embodiments of the invention.

FIG. 10C illustrates exemplary personal computer 1044 that can include touch sensor panel (trackpad) 1024 and display device 1030, with the touch sensor panel and/or display of the personal computer (in embodiments where the display is part of a touch screen) being configured to enable multi-touch shape drawing according to embodiments of the invention. The mobile telephone, media player and personal computer of FIGS. 10A, 10B and 10C can achieve an improved user interface experience associated with generating and modifying shapes according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of an electronic device, the method comprising:
    storing an association between each of a plurality of multi-touch motions and each of a plurality of geometric shapes available to be displayed on a display of the electronic device;
    detecting a first multi-touch motion of a multi-touch gesture applied to a touch-sensitive surface, wherein the first multi-touch motion is associated with each of a plurality of geometric shapes, the plurality of geometric shapes including some, but not all, of the plurality of geometric shapes available to be displayed;
    detecting a second multi-touch motion of the multi-touch gesture, the second multi-touch motion following the first multi-touch motion without intervening multi-touch motions;
    automatically selecting, from only the plurality of geometric shapes associated with the first multi-touch motion, a geometric shape to be displayed based on the detected first and second multi-touch motions of the multi-touch gesture without further user selection; and displaying the selected geometric shape on the display.

2. The method of claim 1, wherein one of the first and second multi-touch motions comprises a linear expansion motion.

3. The method of claim 2, wherein the linear expansion motion comprises a first point of contact on the touch-sensitive surface moving away from a stationary second point of contact on the touch-sensitive surface.

4. The method of claim 2, wherein the linear expansion motion comprises two points of contact on the touch-sensitive surface moving away from each other.

5. The method of claim 1, wherein the multi-touch gesture comprises a lateral expansion motion followed by a linear contraction motion, and the geometric shape to be displayed comprises a triangle or a pyramid.

6. The method of claim 5, wherein the linear contraction motion comprises a first point of contact on the touch-sensitive surface moving toward a stationary second point of contact on the touch-sensitive surface.

7. The method of claim 5, wherein the linear contraction motion comprises two points of contact on the touch-sensitive surface moving toward each other.

8. The method of claim 1, wherein the multi-touch gesture comprises a parallel dual swipe motion followed by a linear contraction motion, and the geometric shape to be displayed comprises a square or a cube.

9. The method of claim 8, wherein the linear contraction motion comprises a first point of contact on the touch-sensitive surface moving toward a stationary second point of contact on the touch-sensitive surface.

10. The method of claim 8, wherein the linear contraction motion comprises two points of contact on the touch-sensitive surface moving toward each other.

11. The method of claim 1, wherein the multi-touch gesture comprises a linear expansion motion followed by a parallel dual swipe motion followed by a linear contraction motion, and the geometric shape to be displayed comprises a rectangle or a box.

12. The method of claim 1, further comprising:
detecting an additional multi-touch gesture applied to the displayed geometric shape; and
modifying the displayed geometric shape based on the additional multi-touch gesture.

13. The method of claim 12, wherein the additional multi-touch gesture comprises a linear expansion motion.

14. The method of claim 13, wherein the modification of the displayed geometric shape comprises scaling the displayed geometric shape.

15. The method of claim 14, wherein the scaling comprises uniform scaling relative to each dimension of the displayed geometric shape.

16. The method of claim 14, wherein the scaling comprises scaling of one dimension of the displayed geometric shape.

17. The method of claim 12, wherein the additional multi-touch gesture comprises a rotational motion.

18. A mobile telephone comprising:
a display;
an input device comprising a touch-sensitive surface; and
a processor configured to
store an association between each of a plurality of multi-touch motions and each of a plurality of geometric shapes available to be displayed on the display,
detect a first multi-touch motion of a multi-touch gesture applied to the touch-sensitive surface, wherein the first multi-touch motion is associated with each of a plurality of geometric shapes, the plurality of geometric shapes including some, but not all, of the plurality of geometric shapes available to be displayed,
detect a second multi-touch motion of the multi-touch gesture, the second multi-touch motion following the first multi-touch motion without intervening multi-touch motions,
automatically select, from only the plurality of geometric shapes associated with the first multi-touch motion, a geometric shape to be displayed based on the detected first and second multi-touch motions of the multi-touch gesture without further user selection, and
display the selected geometric shape on the display.

19. A media player comprising:
a display;
an input device comprising a touch-sensitive surface; and
a processor configured to
store an association between each of a plurality of multi-touch motions and each of a plurality of geometric shapes available to be displayed on the display,
detect a first multi-touch motion of a multi-touch gesture applied to the touch-sensitive surface, wherein the first multi-touch motion is associated with each of a plurality of geometric shapes, the plurality of geometric shapes including some, but not all, of the plurality of geometric shapes available to be displayed,
detect a second multi-touch motion of the multi-touch gesture, the second multi-touch motion following the first multi-touch motion without intervening multi-touch motions,
automatically select, from only the plurality of geometric shapes associated with the first multi-touch motion, a geometric shape to be displayed based on the detected first and second multi-touch motions of the multi-touch gesture without further user selection, and
display the selected geometric shape on the display.

20. A personal computer comprising:
a display;
an input device comprising a touch-sensitive surface; and
a processor configured to
store an association between each of a plurality of multi-touch motions and each of a plurality of geometric shapes available to be displayed on the display,
detect a first multi-touch motion of a multi-touch gesture applied to the touch-sensitive surface, wherein the first multi-touch motion is associated with each of a plurality of geometric shapes, the plurality of geometric shapes including some, but not all, of the plurality of geometric shapes available to be displayed,
detect a second multi-touch motion of the multi-touch gesture, the second multi-touch motion following the first multi-touch motion without intervening multi-touch motions,
automatically select, from only the plurality of geometric shapes associated with the first multi-touch motion, a geometric shape to be displayed based on the detected first and second multi-touch motions of the multi-touch gesture without further user selection, and
display the selected geometric shape on the display.

21. A non-transitory computer readable storage medium storing instructions executable by a computing device to:
store an association between each of a plurality of multi-touch motions and each of a plurality of geometric shapes available to be displayed on a display;
detect a first multi-touch motion of a multi-touch gesture applied to the touch-sensitive surface, wherein the first multi-touch motion is associated with each of a plurality of geometric shapes, the plurality of geometric shapes including some, but not all, of the plurality of geometric shapes available to be displayed;

detect a second multi-touch motion of the multi-touch gesture, the second multi-touch motion following the first multi-touch motion without intervening multi-touch motions;

automatically select, from only the plurality of geometric shapes associated with the first multi-touch motion, a geometric shape to be displayed based on the detected first and second multi-touch motions of the multi-touch gesture without further user selection;

display the selected geometric shape on the display;

detect an additional multi-touch gesture applied to the displayed geometric shape; and modify the displayed geometric shape based on the additional multi-touch gesture.

\* \* \* \* \*